US006564665B1

(12) United States Patent
Hörmann

(10) Patent No.: US 6,564,665 B1
(45) Date of Patent: May 20, 2003

(54) GEAR UNIT FOR GATE DRIVES

(75) Inventor: Michael Hörmann, Oerlinghausen (DE)

(73) Assignee: Marantec Antriebs-und Steuerungstechnik GmbH & Co. Produktions KG, Oerlinghausen (DE)

( * ) Notice: Subject to any disclaimer, the term of this patent is extended or adjusted under 35 U.S.C. 154(b) by 0 days.

(21) Appl. No.: 09/718,606

(22) Filed: Nov. 22, 2000

Related U.S. Application Data

(63) Continuation-in-part of application No. 09/194,938, filed as application No. PCT/EP98/01677 on Mar. 23, 1998, now abandoned.

(30) Foreign Application Priority Data

Apr. 7, 1997 (DE) .................................... 297 06 142 U

(51) Int. Cl.[7] ............................ F16H 1/12; F16H 1/20
(52) U.S. Cl. ............................................ 74/416; 403/3
(58) Field of Search ............................... 74/89.14, 405, 74/416, 425, 451; 403/3, 4

(56) References Cited

U.S. PATENT DOCUMENTS

| | | | | |
|---|---|---|---|---|
| 3,237,469 A | * 3/1966 | Berry et al. | .................. | 74/451 |
| 3,541,871 A | * 11/1970 | Burrell | .................... | 403/359.1 |
| 5,213,001 A | * 5/1993 | Gruettner et al. | ............. | 74/451 |
| 5,518,109 A | * 5/1996 | Dailey et al. | ............... | 198/834 |
| 6,007,033 A | * 12/1999 | Casson et al. | ................. | 703/3 |
| 6,093,009 A | * 7/2000 | Jacks, Jr. | ................. | 418/201.1 |
| 6,301,782 B1 | * 10/2001 | Jacks, Jr. | ................. | 29/402.08 |

FOREIGN PATENT DOCUMENTS

| | | |
|---|---|---|
| DE | 3207909 | 9/1983 |
| DE | 3220441 | 12/1983 |
| DE | 3427505 | 2/1986 |
| DE | 29605380 | 8/1996 |
| EP | 0651123 | 3/1995 |

* cited by examiner

*Primary Examiner*—David Fenstrermacher
(74) *Attorney, Agent, or Firm*—Dilworth Barrese LLP

(57) ABSTRACT

The invention relates to a gear unit with hollow shaft for gate drives, preferably for driving sectional and roller gates. According to the invention the gear unit comprises a hollow shaped part which can be introduced into the hollow shaft, the outside and inside of which are made in such a way that the connection with a shaft to be accomodated in the hollow shaped part and with the hollow shaft accomodating the hollow shaped part is form-locking in the turning direction.

20 Claims, 4 Drawing Sheets

GEAR UNIT FOR GATE DRIVES

This is a continuation in part of application Ser. No. 09/194,938 filed Dec. 7, 1998; now abandoned which is a 371 of PCT/EP98/01677 filed Mar. 23, 1998.

BACKGROUND OF THE INVENTION

The invention relates to a gear unit for gate drives, preferably for driving sectional and roller gates.

The use of such gear units for operating industrial gates is known. Frequently used industrial gates are sectional and roller gates. An important part of the sectional gates is a gate shaft preferably in the form of a torsion spring shaft, which is connected to the gate by means of ropes and rope drums. The gate shaft is accommodated in a hollow shaft of a geared motor in such a way that in the turning direction of the hollow shaft, a form-locking connection is produced. With roller gates, such a gate shaft not only serves to operate the roller gate, but must also hold the wound up roller gate. To obtain, in the turning direction, form-locking connection between the gate shaft and the hollow shaft accommodating the same, the gate shafts are provided, for example, with grooves to hold a fitting spring or with multiple side surfaces; a corresponding negative profiling is provided on the inside of the hollow shaft. Corresponding to the great variation in fitting spring widths and types and differently shaped multiple side surfaces as well as other surface profiles, a multitude of differently constructed hollow shafts must be made available. The hollow shaft together with a mechanical transmission gear, as well as an electric drive motor, generally forms part of a structural unit. Accordingly, due to the profiling of the gate shaft, many different types of gear motors must be manufactured, which considerably increases costs.

SUMMARY OF THE INVENTION

It is the object of the present invention to create a gear unit for gate drives, with which different shapes of shafts, in particular gate shafts, can be driven.

According to the invention, this object is achieved in that the gear unit comprises a hollow shaped part which can be introduced into the hollow shaft; the outside and inside of the hollow shaped part are made in such a way that the connection with a shaft accommodated within the hollow shaped part as well as connection with the hollow shaft accommodating the hollow shaped part, are both form-locking in the turning direction. An advantage of this arrangement is that, when the shaft being accommadated within the hollow part is replaced by a shaft of a different size and/or shape, only the hollow part need be replaced with hollow part having a corresponding profiling on the inside and which can be inserted into the outer hollow shaft. It, therefore, is not necessary to replace the entire geared motor. Because the outside of the hollow shaped parts is shaped, in such a way that in the turning direction, a form-locking connection exists with the outer hollow shaft, only a few different types of geared motors need to be manufactured; adaptation to the specific shapes of the gate shafts always takes place by the insertable hollow shaped parts.

In a preferred embodiment of the present invention, the hollow shaped part is provided on the outside with toothing, a multiple-groove profile or (FIG. 6) or a polygon profile (FIG. 5), as a result of which in the turning direction, a form-locking connection with corresponding inside toothing or with a corresponding profile on the inside of the outer hollow shaft can be produced. A force-locking connection between the hollow shaped part and the outer hollow shaft in the direction of the joint is not necessary, as there are no axial forces; contact between the two parts, to a large extent, prevents shifting of the hollow shaped part.

The connection between the hollow shaped part and hollow shaft may be made form-locking in the turning direction by means of a fitting spring and/or a wedge (FIG. 7). This embodiment has the advantage that the manufacture of the hollow shaft as well as of the hollow shaped part can be carried out relatively simply because of the absence of toothing or a profile and with the same: effect. The connection between the hollow shaped part and hollow shaft by a fitting spring or wedge or by a multiple side toothing or a profile, with the same effect, is preferably made detachable to permit easy exchanging of the hollow shaped part.

In a further embodiment of the invention in the turning direction form-locking Connection between the hollow shaped part and the interior shaft accommodated in the same, preferably a gate shaft, takes place by a fitting spring or a wedge (FIG. 8) or by a profiling of the shaft and a corresponding negative profiling of the inside of the hollow shaped part (ref. no. 28 in FIGS. 1–3). Such a connection is also preferably made detachable to permit an easier separating of the shaft from the hollow shaped part. The connection between the shaft and the hollow shaped part is preferably not made force-locking in the direction of the joint, since an axial shifting of the shaft is prevented by the geared motors or hollow shaped parts delimiting the shaft ends in the axial direction.

The hollow shaped part may, on one side, be closed off by a wall, as a result of which the hollow shaft of the gear unit can be protected against contact with the shaft which it accommodates and accordingly against wear.

According to a preferred embodiment of the present invention, the hollow shaft and/or the hollow shaped part are made of drawn or extruded material.

The drawn or extruded material may comprise steel and/or aluminium.

For the form-locking engaging of the hollow shaft in a profiled drive element of the gear unit, preferably in the form of a worm wheel, the outside of the hollow shaft may be provided with toothing.

BRIEF DESCRIPTION OF THE DRAWINGS

Further details and advantages of the invention are explained in greater detail with reference to an exemplified embodiment illustrated in the drawing, wherein.

DESCRIPTION OF THE PREFERRED EMBODIMENTS

Figure 1:
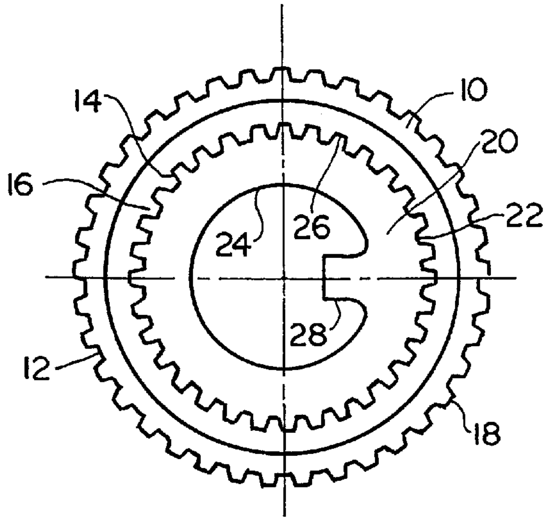
FIG. 1 shows a cross section of the hollow shaft and hollow shaped part in accordance with the invention.
Figure 2:
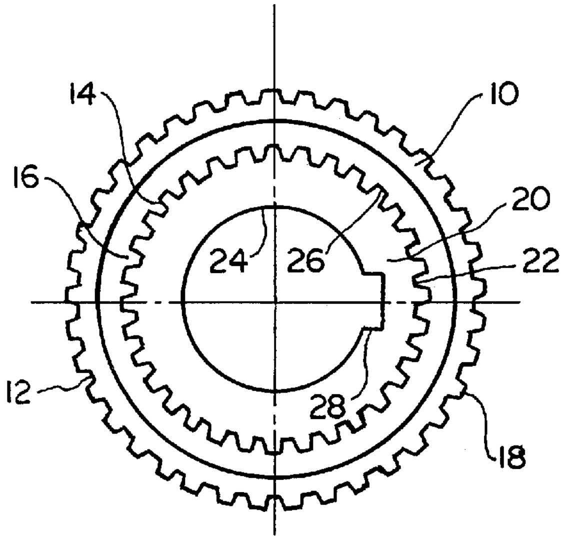
FIG. 2 is a view similar to FIG. 1 of a different embodiment in according with the invention.
Figure 3:
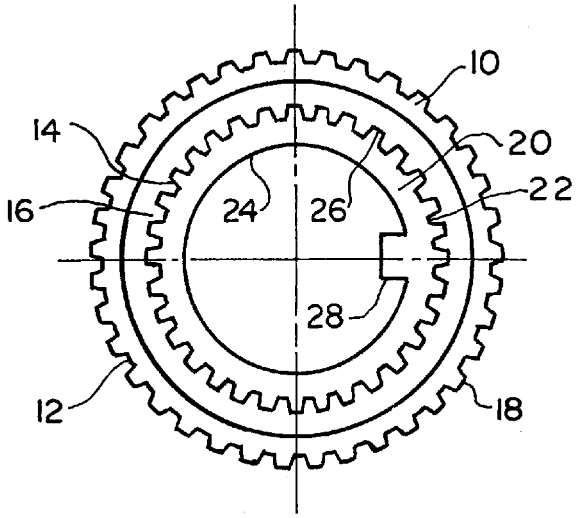
FIG. 3 is a view similar to FIG. 1 of a further embodiment of the invention.

In FIG. 1 to 3 hollow shafts 10 are illustrated, which have an outside 12 and an inside 14. The inside 14 is provided with toothing 16 which engages in a form-locking manner with corresponding toothing 26 on the outside 22 of a hollow shaped part 20. The form-locking connection between the hollow shaft 10 and the hollow shaped part 20 can be loosened by removing the hollow shaped part 20 in the axial direction.

Figure 4:
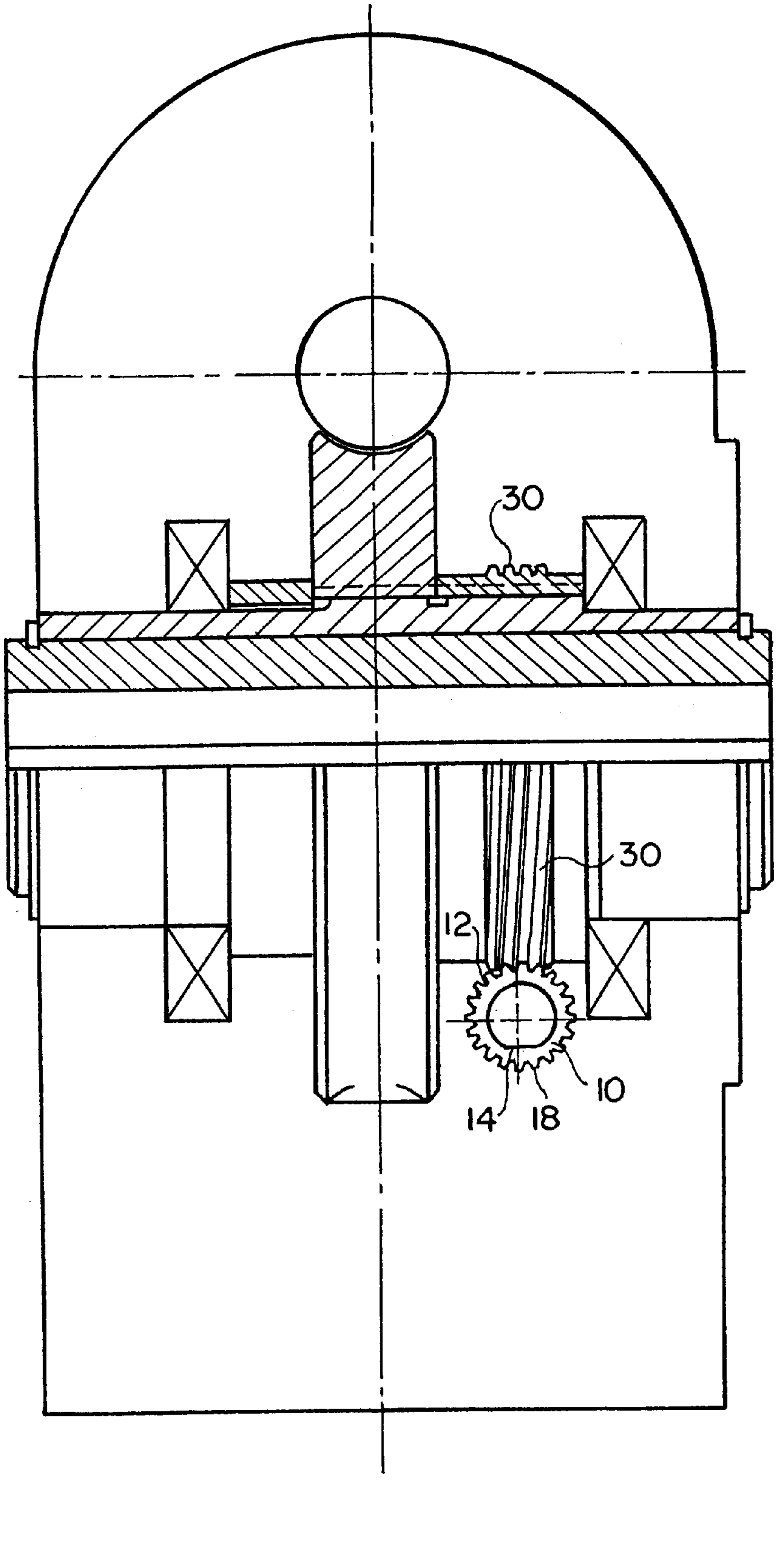
FIG. 4 shows a cross-section and longitudinal section through a gear unit with worm wheel and hollow shaft.

The hollow shaft 10 also has toothing 18 on its outside 12, which engages with corresponding toothing of a worm wheel 30, as illustrated in FIG. 4. By rotating the worm wheel, by way of the toothing 15 and 18 of the hollow shaft 10 as well as the toothing 28 of the hollow shaped part 20, rotating of the hollow shaped part 20 is brought about. The hollow shaped part 20 has an inside 24 provided with a profiling 28 suitable for a form-locking connection with a driven shaft which can be accommodated in the hollow shaped part 20. As illustrated in FIGS. 1 and 3, the profiling 28 may be directed radially inwardly, so that the accommodated driven shaft must have a, groove for a form-locking connection. FIG. 2 shows a radially inwardly directed profiling 28 which serves to accommodate a corresponding projection of the shaft or to accommodate, for example, a fitting spring inserted in the shaft. The shaft is separated from the hollow shaped part 20 after a possible loosening of the fitting spring in the axial direction.

Figure 5:
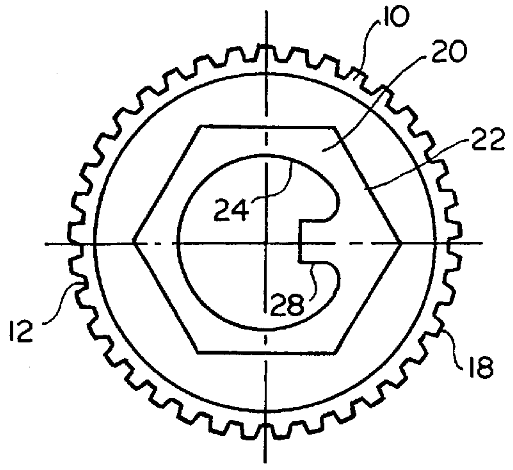
FIG. 5 shows a cross-section of the hollow shaft and the hollow-shaped part of additional embodiment of the invention.
Figure 6:
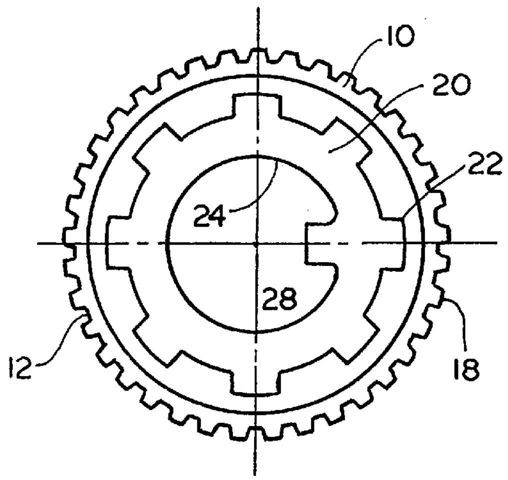
FIG. 6 shows a cross-section of the hollow shaft and hollow-shaped part of a further alternative embodiment in accordance with the invention.
Figure 7:
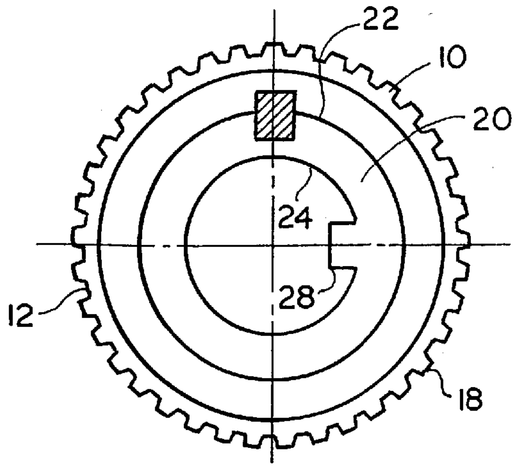
FIG. 7 shows a cross-section of the hollow shaft and hollow-shaped of another embodiment in accordance with the invention.
Figure 8:
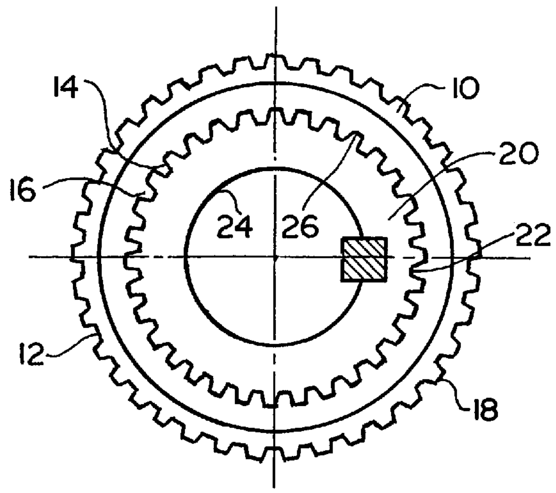
FIG. 8 shows a cross-section of the hollow shaft and hollow-shaped part of yet another embodiment in accordance with the invention.

The inside 24 of the hollow shaped part 20 may, instead of or in combination with the profiling 28, be provided with toothing or, for example, a polygon profile (FIG. 5), and engage in a form-locking manner with a correspondingly shaped outside of the accommodated shaft.

What is claimed is:

1. Gear unit comprising a hollow shaft (10) for gate drives, and a hollow shaped part (20) which is structured and arranged to be introduced into the hollow shaft (10), an outside (22) and inside (24) of the hollow shaped part (20) are structured and arranged such that both the connection with a shaft accommodated within the hollow shaped part (20) and the hollow shaft (10) accommodating the hollow shaped part (20) are form-locking in a rotation direction, a force-locking connection in an axial direction between the hollow shaped part (20) and outer hollow shaft (10) is unnecessary as there is no axial force and contact between the hollow-shaped (20) and outer hollow shaft (10) by said form-locking connection in the rotation direction prevents, to a large extent, shifting of the hollow-shaped part (20) with respect to the outer hollow shaft (10), and said form-locking connection in the rotation direction, between the outer hollow shaft (10) and hollow part (20) can be loosened by removing the hollow-shaped part (20) in the axial direction.

2. Gear unit according to claim 1, wherein the hollow-shaped part (20) is provided on the outside (22) thereof, with toothing (26), a multiple-groove profile, or a polygonal profile, such that in the rotation direction, said form-locking connection with corresponding inner toothing (16) or with a corresponding profile on an inside (14) of the outer hollow shaft (10) is produced.

3. Gear unit according to claim 2, wherein the connection between the hollow shaped part (20) and hollow shaft (10) is made form locking in the rotation direction by at least one of a fitting spring and wedge.

4. Gear unit according to claim 2, wherein, in the rotation direction, said form-locking connection between the hollow shaped part (20) and the shaft accommodated in the same takes place by at least one of a fitting spring, wedge or profiling of the accommodated shaft and corresponding negative profiling (28) of the inside (24) of the hollow shaped part (20).

5. Gear unit according to claim 2, wherein an outer surface (12) of the hollow shaft (10) is provided with toothing (18) which engages, also in a form-locking manner in the rotation direction, with a drive element of said gear unit.

6. Gear unit according to claim 5, wherein the drive element of the gear unit is in the form of a worm wheel (30).

7. Gear unit according to claim 1, wherein said form-locking connection in the rotation direction between the hollow shaped part (20) and hollow shaft (10) is made by at least one of a fitting spring and wedge.

8. Gear unit according to claim 7, wherein in the rotation direction, said form-locking connection between the hollow-shaped part (20) and the shaft accommodated in the same takes place by at least one of a fitting spring, a wedge or profiling of the accommodated shaft and corresponding negative profiling (28) of the inside (24) of the hollow shaped part (20).

9. Gear unit according to claim 7, wherein an outer surface (12) of the hollow shaft (10) is provided with toothing (18) which engages also in a form-locking manner in the rotation direction, with a drive element of said gear unit.

10. Gear unit according to claim 9, wherein the drive element of the gear unit is in the form of a worm wheel (30).

11. Gear unit according to claim 1, wherein in the rotation direction, said form-locking connection between the hollow shaped part (20) and interior shaft accommodated in the same takes place by at least one of a fitting spring, wedge or profiling of the accommodated shaft and a corresponding negative profiling (28) of the inside (24) of the hollow shaped part (20).

12. Gear unit according to claim 1, wherein the hollow shaped part (20), on one side thereof, is closed off by a wall.

13. Gear unit according to claim 1, wherein at least one of the hollow shaft (10) and hollow shaped-part (20) are made by drawing or extruding material.

14. Gear unit according to claim 13, wherein the material comprises at least one of steel and aluminum.

15. Gear unit according to claim 1, wherein an outer surface (12) of the hollow shaft (10) is provided with toothing (18) which engages, in a form-locking manner in the rotation direction thereof, with a drive element of said gear unit.

16. Gear unit according to claim 15, wherein the drive element of the gear unit is in the form of a worm wheel (30).

17. Gear unit according to claim 1, wherein the hollow shaft (10) is structured and arranged for driving sectional and roller gates.

18. Gear unit according to claim 1, wherein the hollow shaped part (20) is intermediately positioned between the outer annular hollow shaft (10) and inner annular shaft accommodated in the same.

19. Gear unit comprising hollow shaft (10) for gate drives, and a hollow-shaped part (20) which is structured and arranged to be introduced into the hollow shaft (10), an outside (22) and inside (24) of the hollow-shaped part (20) are structured and arranged such that both the connection with a shaft accommodated within the hollow-shaped part (20) and the hollow shaft (10) accommodating the hollow-shaped part (20) are form-locking in a rotation direction, and said hollow-shaped part (10) comprises, on the inside (24) thereof, a profiling (28) directed radially inwardly, with an accommodated driven shaft having a groove to receive said radially-inwardly directed profiling (28) of the hollow shaped part (20).

20. Gear unit according to claim 19, structured and arranged such that a force-locking connection in an axial direction, between the hollow-shaped part (20) and inner and outer shafts (10) is unnecessary as there is no axial force and contact between the hollow-shaped part (20) and the outer hollow shaft (10) by said form-locking connection in the rotational direction preventing, to a large extent, shifting of the hollow-shaped part (20) with respect to the outer hollow shaft (10), and said form-locking connection in the rotation direction between the outer hollow shaft (10) and hollow-shaped part (20) structured and arranged to be loosened by removing the hollow-shaped part (20) in the axially direction.

* * * * *